May 17, 1932. J. BETHENOD 1,859,125
MEANS FOR THE PROTECTION OF ELECTRICAL APPARATUS
Filed Jan. 10, 1930
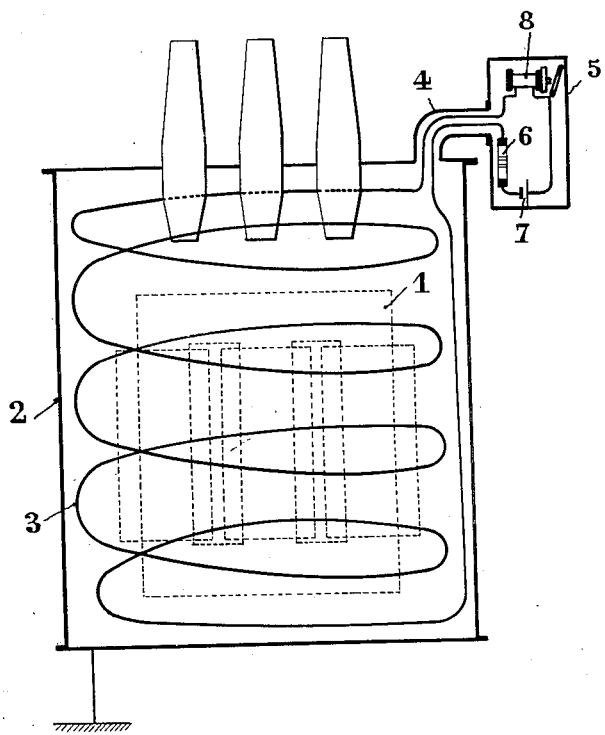
INVENTOR
Joseph Bethenod
BY Stone, Boyden, Mack & Hahn
ATTORNEYS.

Patented May 17, 1932

1,859,125

UNITED STATES PATENT OFFICE

JOSEPH BETHENOD, OF PARIS, FRANCE

MEANS FOR THE PROTECTION OF ELECTRICAL APPARATUS

Application filed January 10, 1930, Serial No. 419,954, and in France January 22, 1929.

The present invention relates to improvements in means for the protection of electrical apparatus, and giving a warning, when a fault occurs in their insulation.

It has already been proposed to protect electrical apparatus, surrounded by an oil bath, when a fault occurs in their insulation, by employing gaseous, vapour or other bubbles formed under the influence of the spark accompanying the fault, to operate, by means of an appropriate relay, either a current-breaker for putting the faulty apparatus out of circuit or a suitable warning device.

The present invention has for object a new system of protection based on a totally different principle from that heretofore employed, which has the advantages of not only operating more rapidly than the methods heretofore employed, but also of being capable of application not only to electric machines and other electrical apparatus placed in a liquid dielectric bath, but also to electrically insulated machines and apparatus surrounded by the atmosphere or placed in any gas or in any solid insulator whatever. Preferably the said machines or apparatus to be protected are enclosed in an electrically conducting casing (container, casing or any metallic envelope whatever), which is closed or nearly closed.

The new system or apparatus according to the present invention is based on the use of the electro-magnetic radiation, produced by the spark, arc or discharges, etc., accompanying the fault, to influence an aperiodic receiving system sensitive to this radiation. This receiving system may subsequently operate, through a suitable amplifier, either a warning device (optical, acoustic or other device), or a circuit-breaker for putting the machine or apparatus to be protected out of circuit or effecting any other suitable protecting operation, etc.

An object of the invention, therefore, is to provide means for the protection of electrical apparatus, when a fault, accompanied by a spark, arc or other discharge, occurs in their insulation, comprising, in combination, receiving means sensitive to the electromagnetic radiation caused by the spark, arc or other discharge accompanying the occurrence of said fault and means connected to said receiving means for operating a suitable protecting device when said radiation occurs.

The radiation or wave-collecting means are in electrical connection with the receiving system properly speaking, according to the invention, and the whole constitutes thus receiving means which are insensitive and inoperative during ordinary conditions of operation of the apparatus, when no spark, etc., occurs but which are adapted to receive and to be operated by the radiation accompanying the spark, arc or discharges etc. caused by the fault. It will be observed thus that the invention utilizes the high-frequency electromagnetic waves which are produced by the spark, arc, or discharge which accompany the fault in the insulation, and that these waves, in the preferred form of device, are received by a detector, and thereby render operative the operating circuit for the protecting device, which is not in operative condition until such waves are received.

According to a further object of the invention, protecting means may also be provided for preventing any untimely operation of the main protecting or warning devices of the apparatus to be protected.

Particularly, in order to avoid any untimely operation caused by an external radiation, for example, the receiving system may be placed in the actual conducting envelope surrounding the machine or apparatus to be protected, which forms a screen against external radiations. Alternatively, only part of the receiving means, comprising the wave collectors, may be placed in this envelope and the other apparatus, constituting the said receiving system, placed in a conducting envelope separate from the first but electrically connected to its mass. In this case, the connecting wires between the two parts of the receiving means should themselves preferably be enclosed in a conducting sheathing for preventing induction.

Further, in order to avoid the functioning of the protecting or warning devices when the machine or apparatus to be protected is only submitted to phenomena of short duration, appropriate parts of the receiving system or subsequent electrical circuits, such as a relay controlled by the receiving system, may be time delayed in operation so that it only operates when the duration of the radiation exists a certain length of time.

The receiving system may be of any suitable type. In particular, types similar to those used in radio-electric technique may be used, these receivers being made aperiodic by the usual means employed for this purpose in this art. The sensitiveness of the receivers will thus be constant, or substantially constant, independent of the frequency and damping of the radiated waves.

The wave collector of the receiving system may comprise, for example, coils of conducting wire arranged around the machine or apparatus to be protected, inside the conducting casing in which the latter is located, and insulated from the walls thereof, the number and form of the said coils varying with the device to be protected or the protecting arrangements employed.

The detector of the receiving system may be of any known type but, in general, it is preferable to use a coherer.

In order that the invention may be more fully understood, an example of its application is described hereinafter with reference to the accompanying drawing, which represents, diagrammatically, an arrangement for the protection of a transformer operating in a metallic container filled with oil.

In accordance with the invention the transformer 1 is surrounded, inside the metallic container 2, by several coils 3 of conducting wire, constituting a wave collector, which are insulated from the walls of the container. The ends of this collector are connected, through an opening formed in the top of the container 2 and a metallic tube 4, to a receiving apparatus which is located in another casing 5, also of metal. In the example shown, the receiving system comprises a coherer 6, mounted in series with the wave collector, an additional source of current, such as a battery or accumulator 7, and a relay 8, of galvanometric or other equivalent type, which operates a warning device, or circuit-breaker, etc.

Also, in the different applications of the invention, the receiving system may be arranged in such a manner that any accident occurring to the said system may be revealed by a special warning system or may cause the functioning of the relay operating the principal warning device, or circuit-breaker, etc. of the system.

Finally, in order to avoid the functioning of the protecting or warning devices when the machine or apparatus to be protected is only submitted to transitory phenomena of short duration, produced for example by a sudden change in potential, a short circuit, or a sudden opening or closing of the circuit-breaker, etc, without causing any damage to the insulation, the relay controlled by the receiving system may be arranged in such a manner that it only operates when the duration of the electro-magnetic radiation exceeds a certain length of time, which may be, as is the general case, only a relatively short time.

It will be understood that the term "receiving system", when used in the claims hereafter, shall be understood as signifying the receiving circuit which includes the detector, source of current, etc, and that the term "receiving means" shall be understood as signifying the wave-collector and the said receiving system jointly, both in the particular example of the invention described hereinbefore.

I claim:—

1. Means for protecting electrical apparatus when a fault occurs in the insulation, comprising in combination an aperiodic receiving system sensitive to the high-frequency electro-magnetic radiation produced by the spark, arc or discharge accompanying the occurrence of said fault, means for influencing said receiving system by said radiation, screens for protecting said means and said receiving system from external radiations, and means connected to said receiving system for operating a suitable protecting device when said radiation occurs.

2. Means for protecting electrical apparatus when a fault occurs in the insulation, comprising in combination an aperiodic receiving system sensitive to the high-frequency electro-magnetic radiation produced by the spark, arc or discharge accompanying the occurrence of said fault, means for influencing said receiving system by said radiation, screens for protecting said means and said receiving system from external radiations, and a relay, connected to said receiving system, for operating a suitable protecting device when said radiation occurs, said relay being so arranged as to operate only when the duration of said electromagnetic radiation exceeds a predetermined time.

3. Means for protecting electrical apparatus when a fault occurs in the insulation, comprising in combination a wave collector for receiving the high-frequency electromagnetic radiation produced by the spark, arc or discharge accompanying the occurrence of said fault, an aperiodic receiving system connected to said wave collector and sensitive to said radiation, metallic screens for shielding said apparatus to be protected and said receiving means from external radiations, and means connected to said receiving system for operating a suitable protecting device when said radiation occurs.

4. Means for protecting electrical apparatus enclosed in a conducting casing, when a fault occurs in the insulation, comprising in combination a wave collector, arranged in the vicinity of said apparatus to be protected and within said conducting casing, adapted to receive the high-frequency electromagnetic radiation produced by the spark, arc or discharge accompanying the occurrence of said fault, an aperiodic receiving system sensitive to said radiation, in electrical connection with said wave collector, metallic screens for shielding said receiving system from external radiations, and means connected to said receiving system for operating a suitable protecting device when said radiation occurs.

5. Means for protecting electrical apparatus enclosed in a conducting casing, when a fault occurs in the insulation, comprising in combination a wave collector, which is arranged within said conducting casing in the vicinity of said apparatus to be protected and is adapted to receive the high-frequency electromagnetic radiation produced by the spark, arc or discharge accompanying the occurrence of said fault, an aperiodic receiving system sensitive to said radiation, an electrical connection between said wave collector and said receiving system, a separate conducting casing for said receiving system whereby the system is screened from external radiations, and means connected to said receiving system for operating a suitable protecting device when said radiation occurs.

6. Means for protecting electrical apparatus in accordance with claim 5, wherein the connecting wires between the wave collector and the receiving system are enclosed in a metallic sheathing to prevent induction.

7. Means for protecting electrical apparatus in accordance with claim 3, wherein said receiving system operates the protecting device through a relay so arranged as to operate only when the duration of the electromagnetic radiation caused by the occurrence of said fault exceeds a predetermined time.

8. Means for protecting electrical apparatus in accordance with claim 3, wherein said receiving system comprises in combination a coherer connected to said wave collector and a relay of the galvanometric type connected to said coherer and adapted to operate said protecting device.

9. In means for the protection of electrical apparatus, when a fault occurs in the insulation, the combination of a wave-collector for receiving high-frequency electromagnetic waves produced by the spark, arc, or discharge accompanying said fault, means for operating a protecting device for said apparatus when such fault occurs, and means positioned to receive said waves from said collector and rendered operative thereby to operate said protective-device-operating means.

10. In means for the protection of electrical apparatus, when a fault occurs in the insulation, the combination of a wave-collector coil wound completely around the apparatus to be protected and adapted to receive high-frequency electromagnetic waves produced by the spark, arc, or discharge accompanying said fault, means for operating a protecting device for said apparatus when said fault occurs, and means positioned to receive said waves from said coil and rendered operative thereby to operate said protective-device-operating means.

11. In means for the protection of electrical apparatus, when a fault occurs in the insulation, the combination of a wave-collector for receiving high-frequency electromagnetic waves produced by the spark, arc, or discharge accompanying said fault, a receiving system connected to said wave-collector and containing a source of current and a detector, and means for operating a protecting device for said apparatus when said fault occurs, connected to said circuit and operated by said source when such high frequency waves are received by said circuit.

12. Means for the protection of electrical apparatus, when a fault occurs in the insulation, comprising, in combination, a wave-collector for receiving the high-frequency electromagnetic radiation produced by the spark, arc, or discharge accompanying the occurrence of said fault, said wave collector comprising a coil wrapped completely around the apparatus to be protected, a receiving system connected to said wave-collector and sensitive to said radiation, and means actuated by said receiving system for operating a protecting device for said apparatus when such radiation occurs.

13. Means for the protection of electrical apparatus comprising, in combination, receiving means sensitive to the high-frequency electromagnetic radiation produced by the spark, arc or discharge accompanying a fault in said apparatus, said means comprising a wave collector coil wound completely around the apparatus to be protected, and a receiving circuit connected to said coil means connected to said receiving means for operating a suitable protecting device for said apparatus when said radiation occurs, and means for preventing unintended operation of said protecting device.

14. Means for the protection of electrical apparatus comprising, in combination, an aperiodic receiving system sensitive to the high-frequency electromagnetic radiation produced by the spark, arc or discharge accompanying a fault in said apparatus, means for influencing said receiving system when said radiation occurs, means connected to said receiving system for operating a suitable protecting device, and means for preventing unintended operation of said protecting device.

15. Means for the protection of electrical apparatus comprising, in combination, an aperiodic receiving system sensitive to the high-frequency electromagnetic radiation produced by the spark, arc or discharge accompanying a fault in said apparatus, means for influencing said receiving system when said radiation occurs, protecting means for preventing operation of said receiving system by radiations other than that caused by said fault, and means connected to said receiving system for operating a suitable protecting device for said apparatus when said radiation occurs.

16. Means for the protection of electrical apparatus comprising, in combination, an aperiodic receiving system sensitive to the high-frequency electromagnetic radiation produced by the spark, arc or discharge accompanying a fault in said apparatus, means for influencing said receiving system by said radiation. protecting means for preventing operation of said receiving system by radiations other than that caused by said fault, and means connected to said receiving system for operating a suitable protecting device for said apparatus, said means comprising a relay operating through said receiving system when said radiation occurs.

17. Means for protecting electrical apparatus enclosed in a conducting casing, when a fault occurs in the insulation of said apparatus, comprising, in combination, a wave-collector for receiving the high-frequency electromagnetic radiation produced by the spark, arc or discharge accompanying the occurrence of said fault, comprising coils of conducting wire arranged completely around the apparatus to be protected and electrically insulated from said casing, a receiving system sensitive to said radiation, in electrical connection with said wave-collector, and means connected to said receiving system for operating a protecting device for said apparatus when said radiation occurs.

18. Means for protecting electrical apparatus when a fault occurs in the insulation thereof, comprising, in combination, a wave-collector arranged in the vicinity of the apparatus to be protected and adapted to receive the high-frequency electromagnetic radiation produced by the spark, arc or discharge accompanying the occurrence of said fault, a receiving system sensitive to said radiation, in electrical connection with said wave-collector, and means connected to said receiving system for operating a protecting device for said apparatus when said radiation occurs, said system comprising a coherer, a relay adapted to operate the protecting device, a source of current, and connections between the same.

In testimony whereof I have hereunto affixed my signature.

JOSEPH BETHENOD.

CERTIFICATE OF CORRECTION.

Patent No. 1,859,125.

May 17, 1932.

JOSEPH BETHENOD.

It is hereby certified that error appears in the printed specification of the above numbered patent requiring correction as follows: Page 3, strike out lines 47 to 53, inclusive, comprising claim 8, and insert the following as claim 8: -

8. Means for protecting electrical apparatus in accordance with claim 3, wherein said protecting device for said apparatus is operated through a relay of the galvanometric type connected to said wave collector through a coherer.

and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.